United States Patent
Herring et al.

(10) Patent No.: US 7,573,810 B2
(45) Date of Patent: Aug. 11, 2009

(54) AVOIDING DEADLOCKS IN PERFORMING FAILOVERS IN COMMUNICATIONS ENVIRONMENTS

(75) Inventors: Jay R. Herring, Hyde Park, NY (US); Aruna V. Ramanan, Poughkeepsie, NY (US); Nicholas P. Rash, Poughkeepsie, NY (US); Karen F. Rash, legal representative, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 607 days.

(21) Appl. No.: 11/302,786

(22) Filed: Dec. 14, 2005

(65) Prior Publication Data

US 2007/0133395 A1 Jun. 14, 2007

(51) Int. Cl.
*H04J 1/16* (2006.01)
(52) U.S. Cl. .................................... 370/216
(58) Field of Classification Search .............. 370/216, 370/217, 218, 219, 220, 221, 223, 224, 225, 370/227, 228, 237, 238.1, 242, 253
See application file for complete search history.

(56) References Cited

U.S. PATENT DOCUMENTS

| | | | |
|---|---|---|---|
| 5,471,623 A | 11/1995 | Napolitano, Jr. | 395/200.03 |
| 5,533,198 A | 7/1996 | Thorson | 395/200.15 |
| 5,696,895 A | 12/1997 | Hemphill et al. | 395/182.02 |
| 5,774,640 A | 6/1998 | Kurio | 395/182.02 |
| 5,848,229 A | 12/1998 | Morita | 395/182.05 |
| 6,021,454 A | 2/2000 | Gibson | 710/129 |
| 6,052,733 A | 4/2000 | Mahalingam et al. | 709/235 |
| 6,292,905 B1 | 9/2001 | Wallach et al. | 714/4 |
| 6,397,345 B1 | 5/2002 | Edmonds et al. | 714/4 |
| 6,622,257 B1 | 9/2003 | Rollins et al. | 714/4 |
| 6,738,872 B2 | 5/2004 | Van Huben et al. | 711/150 |
| 6,742,135 B1 | 5/2004 | Wu | 714/4 |
| 7,287,083 B1 * | 10/2007 | Nay et al. | 709/229 |

FOREIGN PATENT DOCUMENTS

JP 2000172659 A 6/2000

OTHER PUBLICATIONS

"Support of 2.0 Compliant Peripheral Component Interconnect (PCI) Adapters in 2.1 Compliant Systems", IBM Research Disclosure, 40777, p. 292.

"Dual Bidirectional Interposer", IBM Technical Disclosure Bulletin, T.L. Droz, W.J. Ilas and W.C. Troop, vol. 38, No. 04, Apr. 1995, pp. 69-72.

* cited by examiner

*Primary Examiner*—Chi H Pham
*Assistant Examiner*—Alexander Boakye
(74) *Attorney, Agent, or Firm*—Joseph Biela, Esq.; Blanche E. Schiller, Esq.; Heslin Rothenberg Farley & Mesiti P.C.

(57) ABSTRACT

Deadlocks are avoided in performing failovers in communications environments that include partnered interfaces. An ordered set of steps are performed to failover from one interface of a partnered interface to another interface of the partnered interface such that deadlocks are avoided.

20 Claims, 7 Drawing Sheets

AVOIDING DEADLOCKS IN PERFORMING FAILOVERS IN COMMUNICATIONS ENVIRONMENTS

TECHNICAL FIELD

This invention relates, in general, to processing within communications environments, and in particular, to avoiding deadlocks in performing failovers within a communications environment.

BACKGROUND OF THE INVENTION

Deadlocks within a communications environment are caused when a resource being held by one component of the communications environment is requested by another component of the environment, but the component holding the resource is waiting on another resource being held by the component making the request. This is referred to as a circular wait condition and such a condition leads to a deadlock over time. These deadlocks can occur in many types of communications environments, including, but not limited to, networked clusters.

In a networked cluster, nodes of the cluster are coupled to the network using interfaces, such as adapters, which regulate the flow of packets in and out of the cluster. If the connection from the adapter of a node to the network is broken, the node loses its connectivity to the network. To minimize this risk, a dual adapter card, offered by International Business Machines Corporation, Armonk, N.Y., is employed. With a dual adapter, if one adapter loses its connection to the network, packets can be routed through the other adapter of the dual adapter card.

While failover to the other adapter is possible, introducing the failover route on a link failure or restoring the original route when the link recovers can only be performed sequentially. Thus, a condition arises in which there can be a circular wait for some amount of time leading to a deadlocked situation.

Based on the foregoing, a need exists for a capability that facilitates performing failovers in a manner that avoids deadlocks.

SUMMARY OF THE INVENTION

The shortcomings of the prior art are overcome and additional advantages are provided through the provision of a method of facilitating failovers in communications environments. The method includes, for instance, detecting a condition within a communications environment for which a failover is to be performed, the communications environment including one or more partnered interfaces used in coupling components of the communications environment, wherein a partnered interface includes a plurality of interfaces internally coupled to one another; and performing failover from one interface of a partnered interface to another interface of the partnered interface, the performing failover avoiding deadlocks.

System and computer program products corresponding to the above-summarized method are also described and claimed herein.

Additional features and advantages are realized through the techniques of the present invention. Other embodiments and aspects of the invention are described in detail herein and are considered a part of the claimed invention.

BRIEF DESCRIPTION OF THE DRAWINGS

One or more aspects of the present invention are particularly pointed out and distinctly claimed as examples in the claims at the conclusion of the specification. The foregoing and other objects, features, and advantages of the invention are apparent from the following detailed description taken in conjunction with the accompanying drawings in which:

BEST MODE FOR CARRYING OUT THE INVENTION

Figure 1:
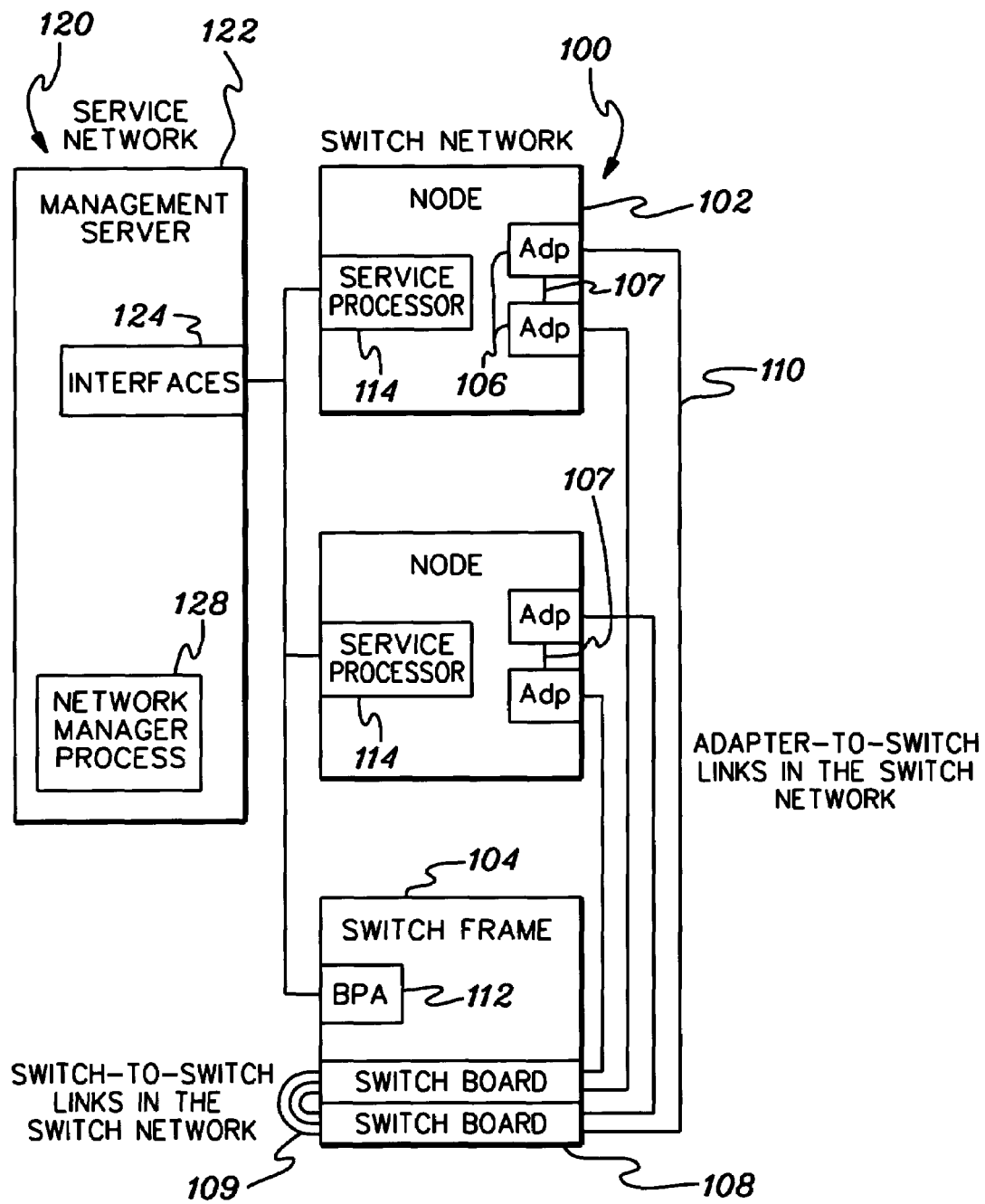
FIG. 1 depicts one example of a switch network coupled to a service network, in accordance with an aspect of the present invention.

In accordance with an aspect of the present invention, a capability is provided that enables failovers to be performed, while avoiding deadlocks, in communications environments that employ partnered interfaces (e.g., dual adapters). The failover is from one interface to another interface of a partnered interface, and can be in response to detecting a failed or other condition, and/or as a part of recovery from a failed or other condition, as examples. As used herein, the term "failover" refers to any situation in which one interface of a partnered interface is to take over for another interface of the partnered interface.

The failover capability of an aspect of the present invention is usable in many environments, including, but not limited to, communications environments having one or more communications networks. One type of a communications network is a switch network, and examples of switch networks are described in U.S. Pat. No. 6,021,442, entitled "Method And Apparatus For Partitioning An Interconnection Medium In A Partitioned Multiprocessor Computer System," Ramanan et al., issued Feb. 1, 2000; U.S. Pat. No. 5,884,090, entitled "Method And Apparatus For Partitioning An Interconnection Medium In A Partitioned Multiprocessor Computer System," Ramanan et al., issued Mar. 16, 1999; U.S. Pat. No. 5,812,549, entitled "Route Restrictions For Deadlock Free Routing With Increased Bandwidth In A Multi-Stage Cross Point Packet Switch," Sethu, issued Sep. 22, 1998; U.S. Pat. No. 5,453,978, entitled "Technique For Accomplishing Deadlock Free Routing Through A Multi-Stage Cross-Point Packet Switch," Sethu et al., issued Sep. 26, 1995; and U.S. Pat. No. 5,355,364, entitled "Method Of Routing Electronic Messages," Abali, issued Oct. 11, 1994, each of which is hereby incorporated herein by reference in its entirety.

One embodiment of a communications network incorporating and using one or more aspects of the present invention is described with reference to FIG. 1. A switch network 100 may be optical, copper, phototonic, etc., or any combination thereof. As is known, a switch network is used in communicating between computing units (e.g., processors) of a system, such as a central processing complex. The processors may be, for instance, pSeries® processors or other processors, offered by International Business Machines Corporation, Armonk, N.Y. One switch network offered by International Business Machines Corporation is the High Performance Switch (HPS) network, an embodiment of which is described in "An Introduction to the New IBM eServer pSeries High Performance Switch," SG24-6978-00, December 2003, which is hereby incorporated herein by reference in its entirety. (IBM and pSeries are registered trademarks of International Business Machines Corporation, Armonk, N.Y., U.S.A. Other names used herein may be registered trademarks, trademarks or product names of International Business Machines Corporation or other companies.)

Switch network 100 includes, for instance, a plurality of nodes 102, such as Power 4 nodes offered by International Business Machines Corporation, Armonk, N.Y., coupled to one or more switch frames 104. A node 102 includes, as an example, one or more interfaces, e.g., adapters 106, coupling nodes 102 to switch frame 104. In this particular example, adapters within a node are partnered and there is an internal connection 107 between the adapters that are partnered. Although in the examples herein a partnered adapter includes two adapters, in other embodiments more than two adapters may be partnered. The partnered adapters are utilized in either a flat, single plane network or in a dual, parallel plane network.

Switch frame 104 includes, for instance, a plurality of switch boards 108, each of which is comprised of one or more switch chips. Each switch chip includes one or more external switch ports, and optionally, one or more internal switch ports. A switch board 108 is coupled to one or more other switch boards via one or more switch-to-switch links 109 in the switch network. Further, one or more switch boards are coupled to one or more adapters of one or more nodes of the switch network via one or more adapter-to-switch links 110 of the switch network.

Although in the example described herein the switch boards are coupled to adapters, in other examples, the switch boards may be coupled to other network interfaces via interface-to-switch links in the switch network. An adapter is one example of a network interface.

Switch frame 104 also includes at least one bulk power assembly 112 coupling the switch frame to a service network 120. Similarly, a node 102 includes, for instance, one or more service processors 114 coupling the node to service network 120. The bulk power assembly may include a service processor. The service processors include logic used at initialization. In a further embodiment, one or more of the service processors or bulk power assemblies may be replaced with other types of links.

Service network 120 is an out-of-band network that provides various services to the switch network. In this particular situation, the service network is responsible for creating the communications routes that are stored on the network adapters (or other interfaces) and for managing failovers. In one example, service network 120 includes a management server 122 having, for instance, one or more interfaces 124 (e.g., Ethernet adapters), which are coupled to one or more service processors 114 of nodes 102 and/or one or more bulk power assemblies 112 of switch frame 104. Management server 122 executes at least one network manager process 128 (also referred to herein as the network manager) that is responsible for managing the failovers, in accordance with an aspect of the present invention.

Figure 2:
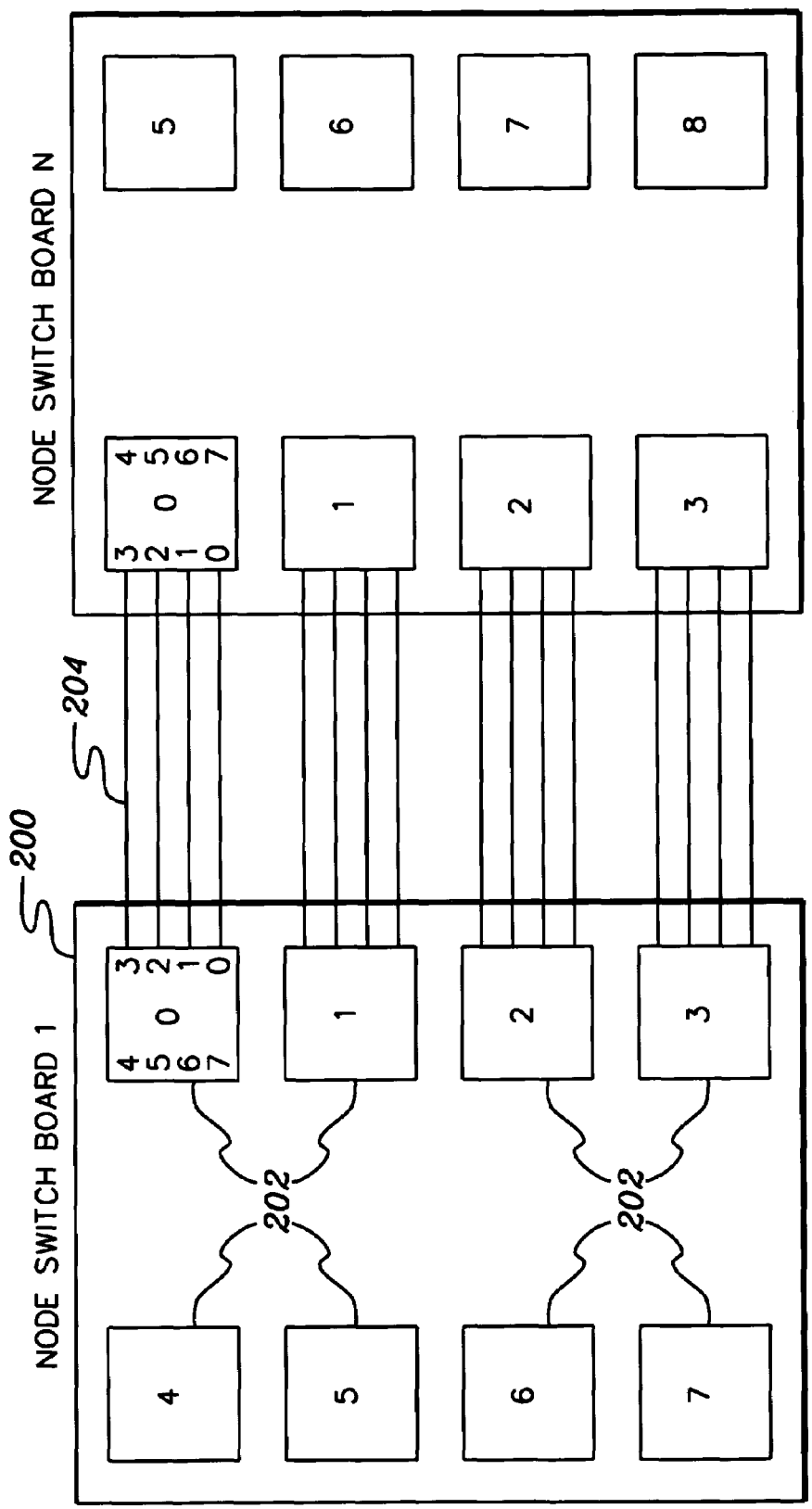
FIG. 2 depicts one example of a single stage network topology, in accordance with an aspect of the present invention.

Network topologies can include networks with single stage or multiple stage switch boards. A network with a single stage topology has node switch boards (NSBs), which are the switch boards at the edges of the network. As used herein, an edge is a location on the network in which a physical connection may be made (e.g., a port in which a switch cable is plugged into to attach an adapter to a switch chip). As shown in FIG. 2, each node switch board 200 includes a plurality of switch chips 202, which are interconnected (not shown) with one another via switch chip ports 4-7. Additionally, switch boards may be coupled to one another via connections, such as connections 204, that are between external ports 0-3 of the switch chips. For clarity purposes, the many connections internal and external to the switch boards are not shown.

Figure 3:
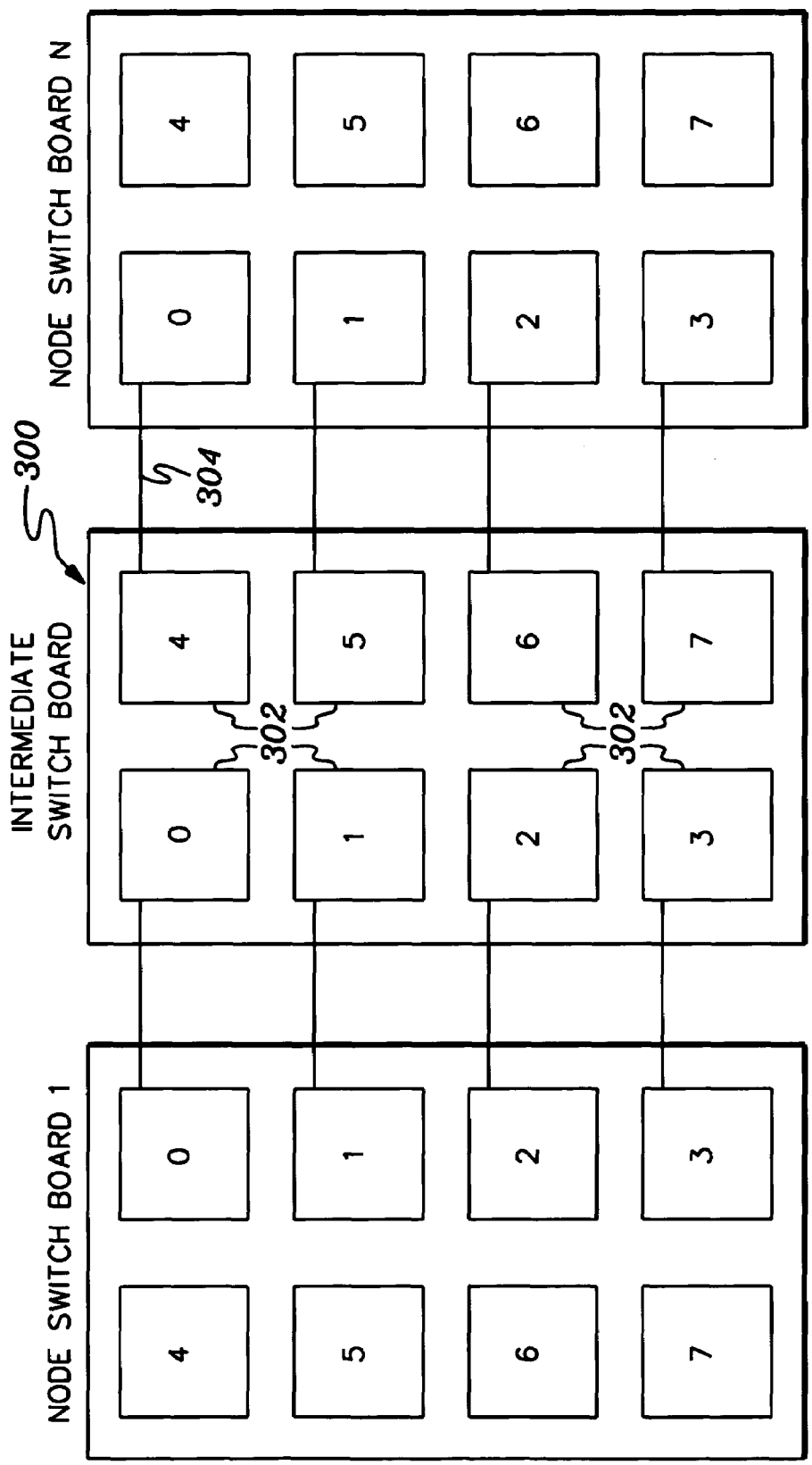
FIG. 3 depicts one example of a two stage network topology, in accordance with an aspect of the present invention.

In a two stage topology, in addition to node switch boards (NSBs), there are intermediate switch boards (ISBs). Similar to node switch boards, an intermediate switch board 300 (FIG. 3) includes a plurality of switch chips 302, each having a plurality of ports. The switch chips of an intermediate switch port may be connected to one another (not shown), as well as externally connected to other intermediate switch boards and/or to node switch boards. One such connection is depicted at 304. For clarity purposes, the many connections internal to the switch boards and external thereto are not shown. In the examples described herein, adapters are connected to node switch boards.

If a connection (e.g., a link) from an adapter to the network is seen as unstable, then, in accordance with an aspect of the present invention, the network port sending data into the adapter is disabled, and the routes from and to the adapter are rerouted through a partner adapter. The connector can then be re-enabled, or it may remain disabled until it is decided that the connection is to be used, again. However, even after a repair action is taken and the connection is restored to a good condition, it is not used, since the routes passing through the connection have been rerouted through the partner adapter. Before restoring the routes over that connection, the send side of the network is disabled once more, if it has been enabled, and the failover routes are restored back to their original routes. The network connection is then re-enabled so that data starts flowing through the connection. Although in the description above the send side is disabled, in another embodiment, both the send and receive sides of the port are disabled. This failover capability is described in further detail below.

Figure 4:
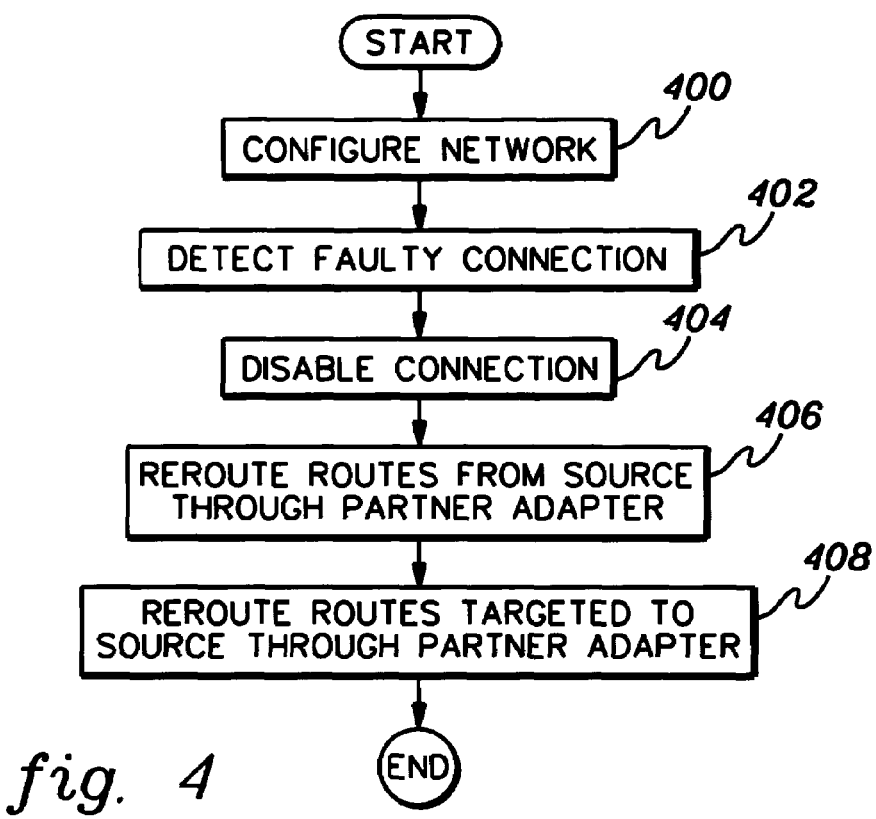
FIG. 4 depicts one embodiment of the logic associated with performing failover, in response to detecting a faulty connection, in accordance with an aspect of the present invention.

One embodiment of the logic associated with performing failover while avoiding deadlock conditions is described with reference to FIGS. 4 and 5a-5b. In particular, FIG. 4 depicts one embodiment of the logic flow associated with performing a failover, and FIGS. 5a-5b pictorially depict aspects of a network configuration for which failover is to be performed. In one example, the failover is managed by network manager process 128 of FIG. 1. However, in further embodiments, other managers or components may perform this function. The manager may be a software manager or a firmware utility, as examples.

Referring to FIG. 4, initially, a network is configured for communication, STEP 400. As shown in FIG. 5a, in one example, a network 500 has three nodes, Node A (502), Node B (504) and Node C (506). Node A has two adapters, A1, A2 (508A, 508B) and those adapters are partners, since they are internally connected to one another, as indicated by connection 509. Similarly, Node B has two adapters, B1, B2 (510A, 510B), which are partners, and Node C has two adapters, C1, C2 (512A, 512B), which are also partners. One adapter for each node is connected to a first port, Port 0 (514), and another adapter of each node is connected to another port, Port 1 (516). Thus, this network has dual adapter pairs in a dual, parallel plane configuration.

Figure 5A:
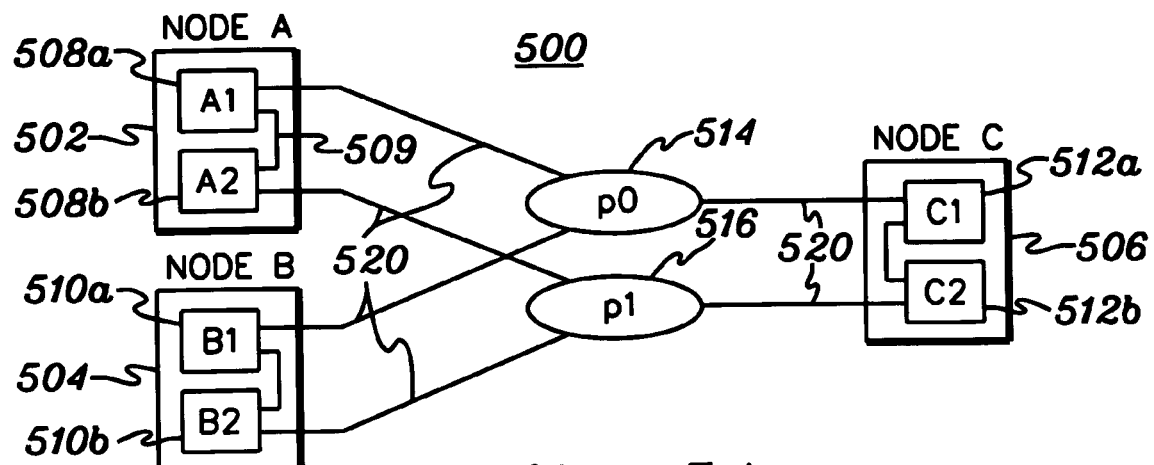
FIG. 5a pictorially depicts a network configuration having partnered interfaces, in accordance with an aspect of the present invention.

The connections (e.g., links 520) depicted in FIG. 5a are stable, and therefore, examples of the available routes are as follows:

| | | |
|---|---|---|
| A1 <=> B1 | B1 <=> C1 | A1 <=> C1 |
| A2 <=> B2 | B2 <=> C2 | C2 <=> A2 |
| A1 => A2 => B2/C2 | B1 => B2 => C2/A2 | C1 => C2 => A2/B2 |
| A2 => A1 => B1/C1 | B2 => B1 => A1/C1 | C2 => C1 => A1/B1 |

As used herein, <=> indicates bidirectional communication and => indicates unidirectional communication. For instance, A1<=>B1 specifies that A1 communicates to B1 (through P0) and B1 communicates to A1 (through P0). Similarly, A1=>A2=>B2/C2 specifies that A1 communicates to A2 (internally) and A2 communicates to B2 or C2 (through P1).

Returning to FIG. 4, at a particular point in time, a faulty connection is detected, STEP 402. It is detected, in one embodiment, by the network manager. The network manager continuously monitors the network connections (e.g., status of the connections) in order to readily determine when a connection is unstable. In another embodiment, the network manager receives notification of a faulty connection.

Figure 5B:
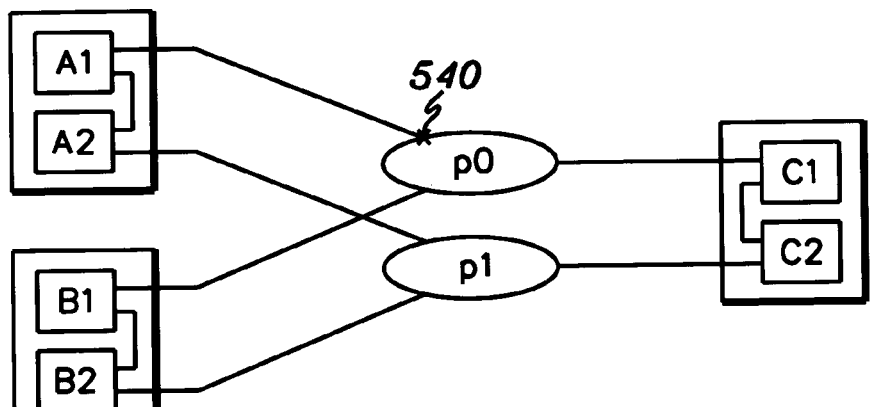
FIG. 5b pictorially depicts a faulty connection associated with one of the interfaces of the configuration of FIG. 5a, in accordance with an aspect of the present invention.

In this example, the connection from A1 to the network is faulty, as pictorially depicted in FIG. 5b by the "x" at reference 540. Therefore, the connection associated with adapter A1 is disabled, STEP 404 (FIG. 4). To disable the connection, the port associated with the connection is disabled. In particular, there is logic on a switch chip for each port and the logic includes an indicator for the send side of the port and an indicator for the receive side of the port. Both indicators, in this example, are set to a particular value (e.g., 0) to disable the port, and thus, the connection.

Subsequent to disabling the connection, the routes from A1 are moved to the failover routes, STEP 406. In particular, the routes from the source adapter (A1 in this example) are rerouted through its partner adapter (A2 in this example). As used herein, the source is the adapter that lost its link and the target is any of the other adapters that include a return route to the source.

| | |
|---|---|
| *A1 => A2 => B2 => B1* | B1 => A1 |
| A1 => A2 => B2 | B1 => B2 => A2 |
| A2 => B2 | B2 => A2 |
| A2 => B2 => B1 | *B2 => B1 => A1* |

The routes in italics (e.g., A1=>A2=>B2=>B1 and B2=>B1=>A1) are routes that form cycles. The routes between A1 and B1 are overlapping.

Moreover, the routes targeted to the source are also rerouted through the partner adapter, STEP 408. The routes from B are eventually moved failover routes, breaking the cycle. Examples of the routes are as follows:

| | |
|---|---|
| A1 => A2 => B2 => B1 | B1 => B2 => A2 => A1 |
| A1 => A2 => B2 | B1 => B2 => A2 |
| A2 => B2 | B2 => A2 |
| A2 => B2 => B1 | B2 => A2 => A1 |

There is a potential for deadlock to occur if:
i) the link is able to pass data;
ii) there is a lag between the handling of hosts A and B for building failover routes; and
iii) A1 is sending data to B1 and B2 is sending data to A1.

A fault is, for instance, a total failure or a failure to operate correctly. While a total failure prevents data from flowing through the link, erroneous behavior still allows data to pass through. Deadlocks cannot occur if the link is faulty or cannot pass data because of failure of condition (i). However, when the link is unstable, i.e. passes data either on and off or with error, conditions (ii) and (iii) occurring together can cause deadlock.

Since the change to failover routes is performed sequentially, in one example, there is a finite time window when the intermediate state or condition (ii) becomes true. Depending on the size of the network and the order in which the hosts are handled for generating failover routes, the time window can be significantly large to cause an effect.

The intermediate condition causes cycles irrespective of whether A is handled first or B is handled first. Such deadlock is avoided if the link from A1 into the network is disabled before the routes are modified to failover routes.

When the faulty link is repaired, the failover routes are replaced by original routes. The restoration is also performed sequentially, in one example. Thus, it can be seen that there is a potential for deadlock during that operation. Keeping the repaired link disabled until the original routes are restored ensures deadlocks are avoided.

Figure 6:
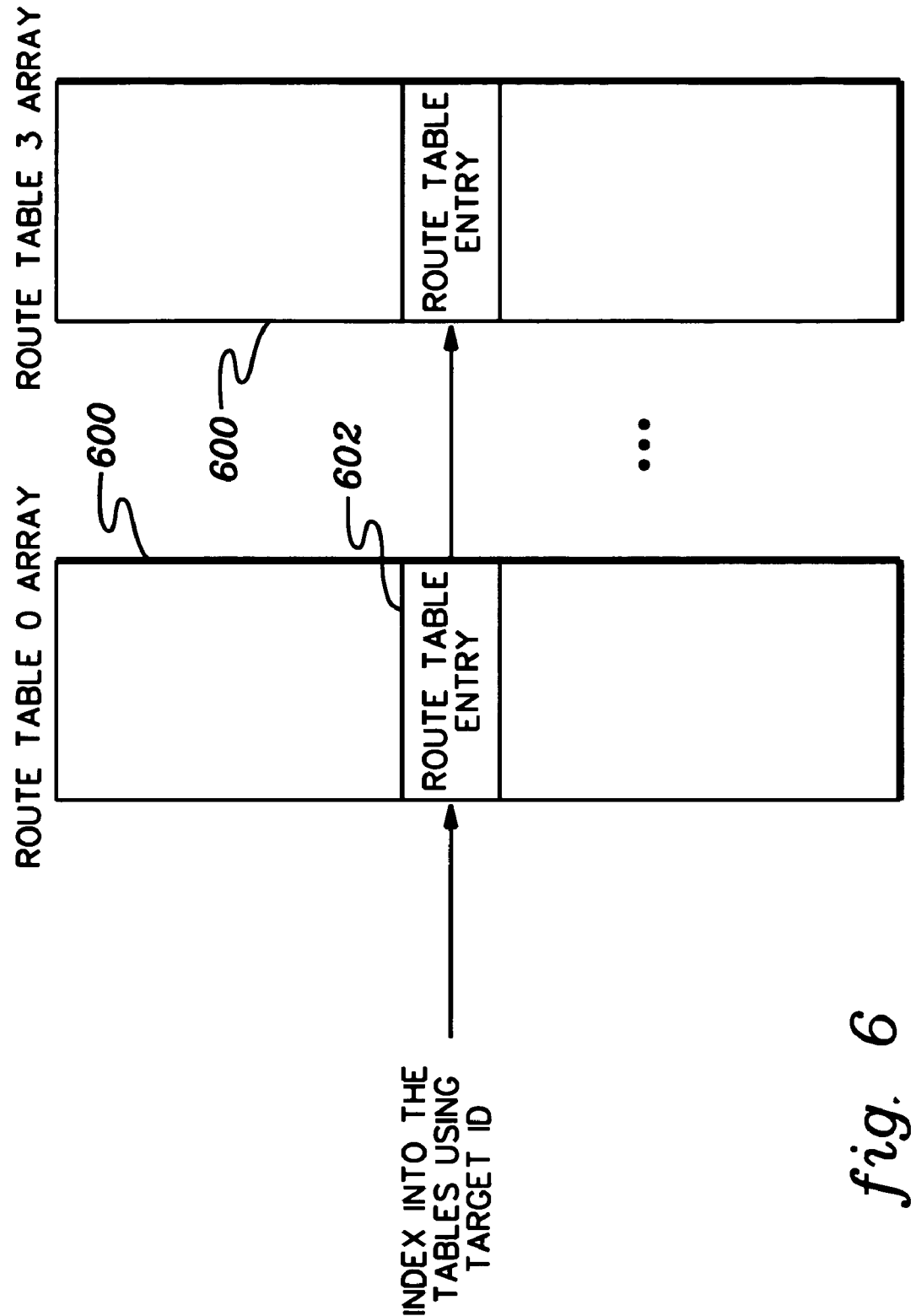
FIG. 6 depicts one example of a route table used in accordance with an aspect of the present invention.

In one example, the routes are maintained in one or more route tables stored on each adapter (a.k.a., interface). For instance, each adapter (FIG. 1) includes a plurality, e.g., three or more, route tables 600 (FIG. 6). Each entry 602 in the route table defines a unique route for moving an incoming packet to its destination, as specified by an index. In exemplary embodiments, each route spans one or more switching elements and two or more links in the cluster network. The format of the route table depends on the network architecture. A predetermined number of paths (e.g., four) are chosen from among the plurality of paths available between a source-destination node-pair to define the routes between the pair. A set of routes is thus defined between a source and other destinations in the network; this set of routes is placed on the source in the form of route tables 600.

To reroute a route, one or more entries in one or more of the route tables are updated to reflect the new route. In a further embodiment, various possibilities are included in different entries of the tables and the appropriate entries are selected.

The steps described above (e.g., steps 402-408) are performed by network manager process 128 (FIG. 1). The steps are performed, in this embodiment, in the order defined in FIG. 4. This ensures that the failover is performed quickly and without causing deadlocks.

Figure 7:
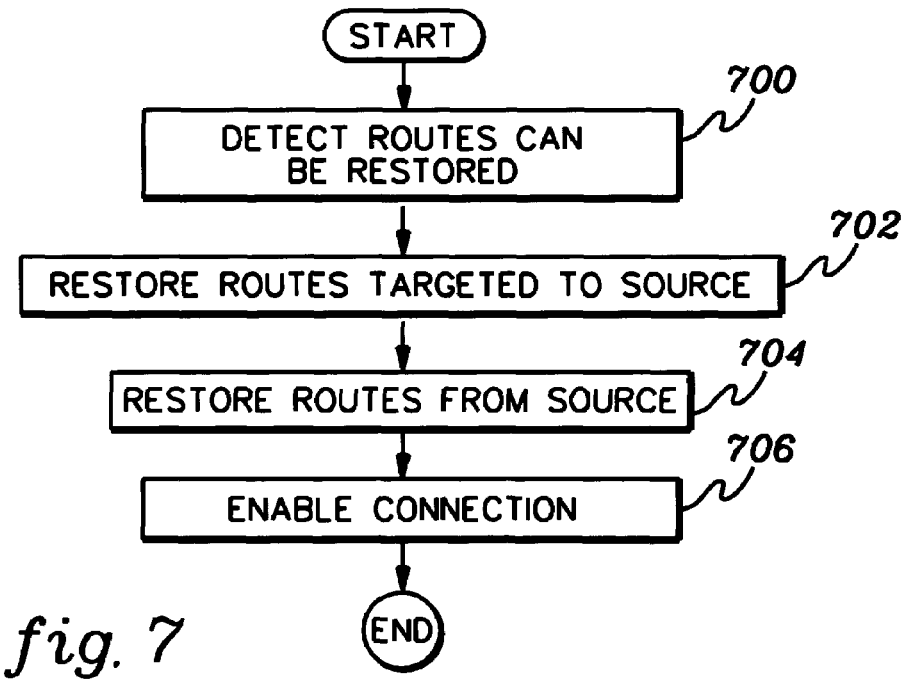
FIG. 7 depicts one embodiment of the logic associated with performing failover to restore routes, in accordance with an aspect of the present invention.

The disabled port remains disabled, in this embodiment, until the connection is repaired. Subsequent to repairing the connection, the routes are restored, if desired. In one example, the routes are restored in the reverse order and the link is re-enabled. One embodiment of the logic associated with restoring the original routes is described with reference to FIG. 7.

Initially, it is detected that the routes can be restored, STEP 700. In one example, network manager process 128 determines either by monitoring and checking status or receiving notification, as examples, that the connection is available again. When the connection is available, the routes are restored in the reverse order. For example, the routes targeted to the source are rerouted back through the source, STEP 702, and then the routes from the source are restored, STEP 704. Thereafter, the connection is enabled, STEP 706.

Figure 8:
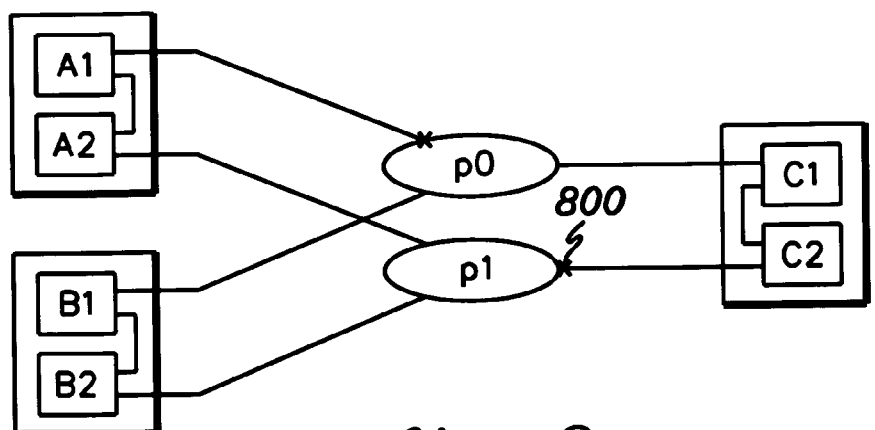
FIG. 8 pictorially depicts a faulty connection associated with another interface of the configuration of FIG. 5a, in accordance with an aspect of the present invention.

In a further embodiment of the invention, it is possible that another link error happens while the first link is disabled. The technique described herein is still effective in avoiding deadlocks (e.g., circular waits) when there is more than one error. For example, assume that the connection from C2 to the network fails, as depicted in FIG. 8 at 800. The network port connected to C2 is disabled and the routes on C2 are moved to the failover routes. At the end of handling the rerouting of routes on C, the routes are as follows:

B2=>B1=>C1=>C2, C1=>C2=>A2 xxx; and the other in bold italics (e.g., A2=>C2=>C1 xxx, B1=>B2=>A2, C2=>C1=>B1=>B2).

Irrespective of whether A1's link or C2's link is restored first, the deadlock condition is avoided, as long as the steps for either one of them is performed while that port is kept disabled for the changing of the routes.

Described in detail above is a capability for performing failover while avoiding deadlocks. In accordance with an aspect of the present invention, a stepwise procedure is provided for failing over from one interface of a partnered interface to another interface of that partnered interface. This failover may take place in response to detecting a faulty connection and/or in response to determining that a faulty connection has been repaired, and thus, the routes are to be restored. In performing the failover, a critical link is temporarily disabled in order to break the cyclic condition.

One or more aspects of the present invention can be included in an article of manufacture (e.g., one or more computer program products) having, for instance, computer usable media. The media has therein, for instance, computer readable program code means or logic (e.g., instructions, code, commands, etc.) to provide or facilitate the capabilities of the present invention. The article of manufacture can be included as a part of a computer system or sold separately.

Figure 9:
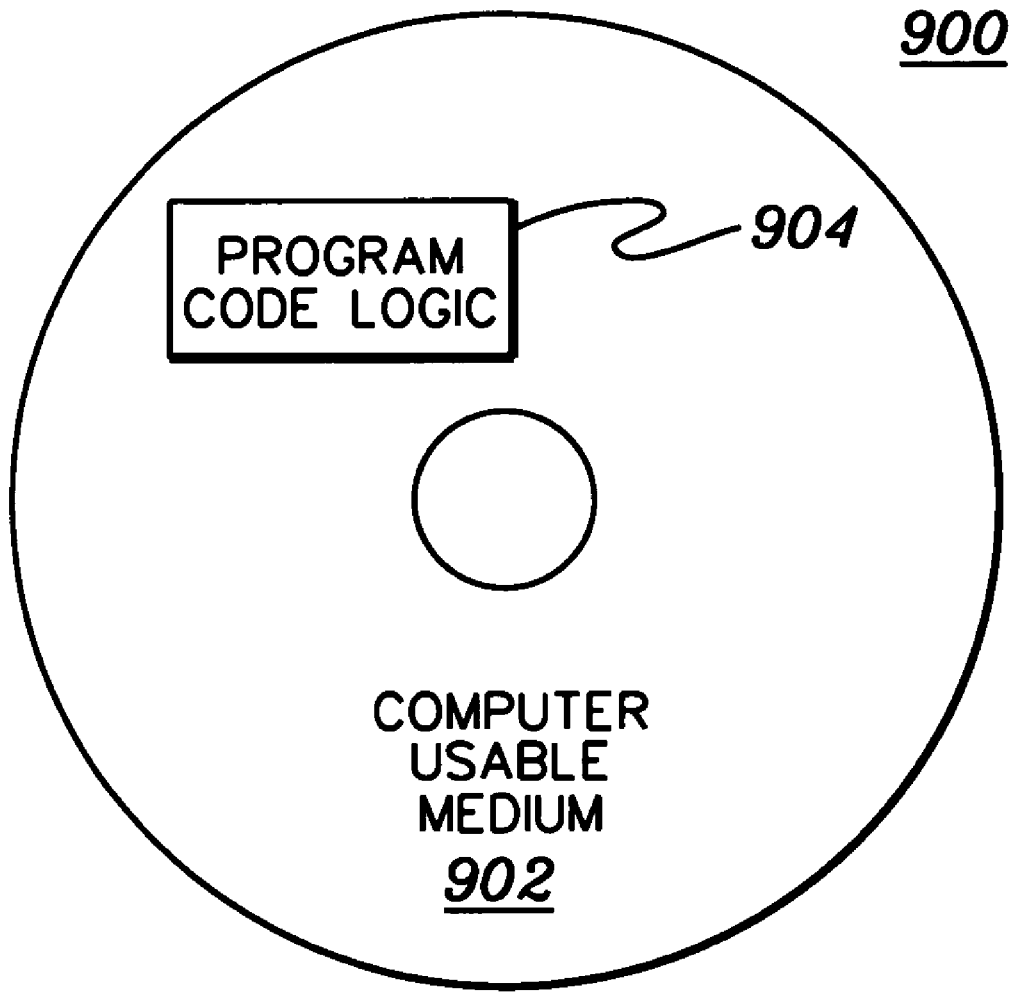
FIG. 9 depicts one embodiment of a computer program product embodying one or more aspects of the present invention.

One example of an article of manufacture or a computer program product incorporating one or more aspects of the present invention is described with reference to FIG. 9. A

| | | |
|---|---|---|
| A1 => A2 => B2 => B1 | B1 => B2 => A2 => A1 | C1 => C2 => A2 => A1 |
| A1 => A2 => B2 | *B1=> B2=> A2* | C1 => C2 => A2 |
| A2 => B2 | B2 => A2 | C2 => A2 |
| A2 => B2 => B1 | B2 => A2 => A1 | C2 => A2 => A1 xxx |
| A1 => A2 => C2 => C1 | B1 => C1 | C1 => B1 |
| A1 => A2 => C2 | B2 => B1 => C1 | C2 => C1 => B1 |
| A2 => C2 | B2 => C2 | *C2=> C1=> B1=> B2* |
| *A2=> C2=>C1* | B1 => B2 => C2 | C1 => B1 => B2 |

In the above, the bold italics (e.g., A2=>C2=>C1, C2=>C1=>B1=>B2, B1=>B2=>A2) are overlapping routes that form cycles. An unusable path is indicated by xxx.

The routes on other nodes are moved to their failover routes, and examples of the new routes are as follows:

computer program product 900 includes, for instance, one or more computer usable media 902, such as, a floppy disk, a high capacity read-only memory in the form of an optically read compact disk or CD-Rom, a tape, a transmission type media, such as a digital or analog communications link, or

| | | |
|---|---|---|
| A1 => A2 => B2 => B1 | B1 => B2 => A2 => A1 | C1 => C2 => A2 => A1 xxx |
| A1 => A2 => B2 | *B1=> B2=> A2* | *C1 => C2 => A2* xxx |
| A2 => B2 | B2 => A2 | C2 => A2 xxx |
| *A2 => B2 => B1* | B2 => A2 => A1 | C2 => A2 => A1 xxx |
| A1 => A2 => C2 => C1 xxx | B1 => C1 | C1 => B1 |
| A1 => A2 => C2 xxx | B2 => B1 => C1 | C2 => C1 => B1 |
| A2 => C2 xxx | *B2 => B1 => C1 => C2* | *C2=> C1=> B1=> B2* |
| *A2=> C2=> C1*xxx | B1 => C1 => C2 | C1 => B1 => B2 |

Again, the xxx following some routes indicate that those paths cannot be used because of the links to and from A1 and C2 have been disabled. There is a possibility of forming cyclic routes, but in all cases a faulty link is part of the cycle. Such cycle is broken since the faulty links are disabled such that no data can be passed through them.

Moreover, in the above example, two cycles are shown: the first in italics, which includes A2=>B2=>B1, other recording media. Recording medium 902 stores computer readable program code means or logic 904 thereon to provide and facilitate one or more aspects of the present invention.

A sequence of program instructions or a logical assembly of one or more interrelated modules defined by one or more computer readable program code means or logic direct components of the service network and/or switch network to perform one or more aspects of the present invention.

The capabilities of one or more aspects of the present invention can be implemented in software, firmware, hardware or some combination thereof. At least one program storage device readable by a machine embodying at least one program of instructions executable by the machine to perform the capabilities of the present invention can be provided.

Although examples are described herein, many variations to these examples may be provided without departing from the spirit of the present invention. For instance, switch networks other than the high performance switch network offered by International Business Machines Corporation may benefit from one or more aspects of the present invention. Similarly, other types of networks may benefit from one or more aspects of the present invention. Further, the switch network described herein may include more, less or different devices than described herein. For instance, it may include less, more or different nodes than described herein, as well as less, more or different switch frames than that described herein. Additionally, the links, adapters, switches and/or other devices or components described herein may be different than that described and there may be more or less of them. In the examples herein, the hardware components of the network are autonomous, but this is not necessary in other embodiments. Further, the service network may include less, additional or different components than that described herein.

In yet other embodiments, components other than network managers may perform one or more aspects of the present invention. Further, the network manager may be a part of the communications network, separate therefrom or a combination thereof.

Additionally, the network can be in a different environment than that described herein. Moreover, one or more aspects of the present invention may be incorporated and/or used in communications environments other than networks, such as in computing environments or other types of systems. These and other variations are considered to be included within the scope of the claimed invention.

Advantageously, one or more aspects of the present invention enable failovers to be performed quickly and without causing deadlocks. For instance, a faulty connection is detected rapidly, due to constant monitoring, and the failover is performed without delay. This enables a circular wait to be broken fast enough to avoid a deadlock situation. Further, the steps of the failover are performed in a particular order to avoid deadlocks.

Yet further, failover is performed invisibly to applications running on the cluster. A connection (e.g., a critical link) is identified that can be disabled while routes are moved to the failover routes or back, such that the circular wait condition is broken. This avoids deadlocks.

Moreover, centralized link coherence is provided, in which the hosts have the same perceived status about a link at the same time.

One or more aspects of the present invention can be performed in response to many conditions, including, but not limited to, faulty connections, removal of links, a desire to disable a connection, restoration of a connection, etc.

The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

Although preferred embodiments have been depicted and described in detail herein, it will be apparent to those skilled in the relevant art that various modifications, additions, substitutions and the like can be made without departing from the spirit of the invention and these are therefore considered to be within the scope of the invention as defined in the following claims.

What is claimed is:

1. A method of facilitating failovers in communications environments, said method comprising: detecting, by a network manager of a communications environment, a condition within a communications environment for which a failover is to be performed, said communications environment comprising one or more partnered interfaces used in coupling components of the communications environment, wherein a partnered interface comprises a plurality of interfaces internally coupled to one another; and performing failover, by the network manager, from one interface of a partnered interface to another interface of the partnered interface, said performing failover avoiding deadlocks in the communications environment, wherein a deadlock is caused by a circular wait condition in which a resource held by one entity of the communications environment is requested by another entity of the communications environment, but the one entity is waiting on another resource being held by the another entity making the request.

2. The method of claim 1, wherein the performing failover comprises:
    disabling a connection associated with the one interface; and
    moving one or more routes associated with the one interface to the another interface.

3. The method of claim 2, wherein the moving the one or more routes comprises:
    rerouting at least one route in which the one interface is a source of the at least one route from the one interface through the another interface; and
    rerouting at least one route in which the one interface is a target of the at least one route to the one interface through the another interface.

4. The method of claim 3, wherein the rerouting of the at least one route in which the one interface is the target is performed subsequent to the rerouting of the at least one route in which the one interface is the source.

5. The method of claim 1, further comprising restoring failover from the another interface to the one interface.

6. The method of claim 5, wherein the restoring failover from the another interface to the one interface comprises:
    rerouting at least one route in which the one interface is a target of the at least one route to the another interface through the one interface;
    rerouting at least one route in which the one interface is a source of the at least one route from the another interface through the one interface; and
    enabling a disabled connection associated with the one interface.

7. The method of claim 6, wherein the rerouting of the at least one route in which the one interface is the source is performed subsequent to the rerouting of the at least one route in which the one interface is the target.

8. The method of claim 1, further comprising performing failover from one interface of another partnered interface to another interface of the another partnered interface, wherein the performing failover from the one interface of the another partnered interface avoids deadlocks in the communications environment.

9. The method of claim 8, wherein the failover from the one interface of the partnered interface and the failover from the one interface of the another partnered interface are concurrent.

10. The method of claim 1, wherein the communications environment comprises a communications switch network, the communications switch network comprising a node, said node comprising a first adapter and a second adapter, said first adapter and said second adapter internally coupled to one another and each of said first adapter and said second adapter coupling the node to a switch of the switch communications network, said one interface comprising the first adapter and the another interface comprising the second adapter.

11. The method of claim 1, wherein the partnered interface comprises a plurality of interfaces internally coupled to one another and residing in a same node of the communications environment, the partnered interface used to couple the node to a component of the communications environment and to route data.

12. A system of facilitating failovers in communications environments, said system comprising:
  a network manager to detect a condition within a communications environment for which a failover is to be performed, said communications environment comprising one or more partnered interfaces used in coupling components of the communications environment, wherein a partnered interface comprises a plurality of interfaces internally coupled to one another; and
  the network manager to perform failover from one interface of a partnered interface to another interface of the partnered interface, said performing failover avoiding deadlocks in the communications environment, wherein a deadlock is caused by a circular wait condition in which a resource held by one entity of the communications environment is requested by another entity of the communications environment, but the one entity is waiting on another resource being held by the another entity making the request.

13. The system of claim 12, wherein to perform failover, the network manager disables a connection associated with the one interface, and moves one or more routes associated with the one interface to the another interface.

14. The system of claim 13, wherein to move the one or more routes, at least one route in which the one interface is a source of the at least one route is rerouted from the one interface through the another interface, and at least one route in which the one interface is a target of the at least one route is rerouted to the one interface through the another interface.

15. The system of claim 12, wherein the network manager is to restore failover from the another interface to the one interface.

16. An article of manufacture comprising:
  at least one computer usable medium having computer readable program code logic to facilitate failovers in communications environments, the computer readable program code logic comprising:
    detect logic to detect a condition within a communications environment for which a failover is to be performed, said communications environment comprising one or more partnered interfaces used in coupling components of the communications environment, wherein a partnered interface comprises a plurality of interfaces internally coupled to one another; and
    perform logic to perform failover from one interface of a partnered interface to another interface of the partnered interface, said performing failover avoiding deadlocks in the communications environment, wherein a deadlock is caused by a circular wait condition in which a resource held by one entity of the communications environment is requested by another entity of the communications environment, but the one entity is waiting on another resource being held by the another entity making the request.

17. The article of manufacture of claim 16, wherein the perform logic comprises:
  disable logic to disable a connection associated with the one interface; and
  move logic to disable one or more routes associated with the one interface to the another interface.

18. The article of manufacture of claim 17, wherein the move logic comprises:
  reroute logic to reroute at least one route in which the one interface is a source of the at least one route from the one interface through the another interface; and
  reroute logic to reroute at least one route in which the one interface is a target of the at least one route to the one interface through the another interface.

19. The article of manufacture of claim 18, wherein the rerouting of the at least one route in which the one interface is the target is performed subsequent to the rerouting of the at least one route in which the one interface is the source.

20. The article of manufacture of claim 16, further comprising logic to restore failover from the another interface to the one interface.

* * * * *